(12) United States Patent
Svensson et al.

(10) Patent No.: US 8,849,200 B2
(45) Date of Patent: Sep. 30, 2014

(54) CONTROLLING PAIRING OF ENTITIES RESPONSIVE TO MOTION CHALLENGES AND RESPONSES

(75) Inventors: Martin Svensson, Stockholm (SE); Kenta Yasukawa, Kanagawa (JP); Bo Xing, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 297 days.

(21) Appl. No.: 13/232,285

(22) Filed: Sep. 14, 2011

(65) Prior Publication Data

US 2013/0065517 A1    Mar. 14, 2013

(51) Int. Cl.
*H04B 7/00*    (2006.01)
(52) U.S. Cl.
USPC .............. 455/41.2; 455/41.3; 345/158; 726/2
(58) Field of Classification Search
CPC ....... G06F 3/14; G06F 3/0346; G06F 1/3203; G06F 1/3231; G06F 3/011; G06F 17/30867; G06F 17/30873; G06F 3/017; G06F 3/04883; A63F 2300/1075; A63F 2300/204; A63F 2300/535; A63F 13/12; A63F 2250/0457; A63F 2300/105; A61B 5/11; A61B 5/1115; A61B 5/412; A61B 5/447; A61B 5/6887; A61B 5/0002
USPC .............. 455/39, 41.1–41.3, 67.11; 342/118, 342/386; 463/36, 37, 43; 715/700, 863; 709/203, 227; 726/3, 7
See application file for complete search history.

(56) References Cited

U.S. PATENT DOCUMENTS

| | | | |
|---|---|---|---|
| 2007/0236330 A1* | 10/2007 | Cho et al. ..................... | 340/5.54 |
| 2009/0150983 A1* | 6/2009 | Saxena et al. .................... | 726/7 |
| 2011/0078236 A1* | 3/2011 | Olsen et al. ................... | 709/203 |

* cited by examiner

Primary Examiner — Golam Sorowar

(57) ABSTRACT

Methods, electronic resources, and electronic pairing entities are disclosed that control pairing between electronic resources and pairing entities for communications there between. A motion challenge is generated that identifies a physical motion that is to be followed by the pairing entity to obtain pairing to the electronic resource. A motion response by the pairing entity is compared to the motion challenge. Pairing between the pairing entity and the electronic resource is controlled in response to the comparison.

2 Claims, 8 Drawing Sheets

CONTROLLING PAIRING OF ENTITIES RESPONSIVE TO MOTION CHALLENGES AND RESPONSES

TECHNICAL FIELD

The present invention relates to communication systems and, more particularly, to controlling pairing between electronic devices for purposes of communications.

BACKGROUND

The approaches described in this section could be pursued, but are not necessarily approaches that have been previously conceived or pursued. Therefore, unless otherwise indicated herein, the approaches described in this section are not prior art to claims in this application and are not admitted to be prior art by inclusion in this section.

For communication systems, pairing in general is the act of grouping two or more entities together for various purposes such as establishing a dedicated communication channel, building a trust relationship, and authenticating/identifying each other. One of the entities can be referred to as a pairing entity and the other referred to as an electronic resource. The pairing entity can be a physical electronic device or a human being which seeks to establish a communication channel or trust relationship with the electronic resource. The electronic resource can be one or more physical electronic devices and may be connected to one or more data networks.

With the ongoing evolution towards an all connected world, there are exponentially growing demands for interactions between humans and electronic devices, and between electronic devices. Pairing is in many cases a primary way for starting such interactions, and it thus is desirable to provide pairing processes that balance demands for human interface simplicity and communication security.

Various approaches for entity pairing which may be relevant to the present disclosure are discussed below.

In one approach, a user operated electronic device (pairing entity) is paired to an electronic resource, such as a point-of-transaction terminal (e.g., sales terminal, product information kiosk, etc.). A user may, for example, operate a mobile communication terminal to pair with a product information kiosk to establish a dedicated communication channel for retrieving product information, which may be personalized for the user (recommendations, advertisements, electronic coupons). The pairing process may include the user running a barcode scanner application on the mobile communication terminal to scan a 1-dimensional or 2-dimensional barcode (e.g., Quick Response (QR) matrix code), to communicate the scanned information to the product information kiosk to control pairing with the mobile communication terminal.

In another approach, pairing is controlled between a human (pairing entity) and a Web resource. To prevent an automated software agent from maliciously accessing Web resources, a challenge-response based scheme called CAPTCHA has become widely used. CAPTCHA is a type of challenge-response test used to confirm that a human is generating a pairing request. The pairing process usually includes an electronic device (e.g., a Web page server) asking a user to complete a test which the electronic device is able to generate and grade. For example, before a Web resource is provided to a user, a Web page displays a distorted image of letters and/or digits, and requires the user to correctly type the letters or digits. Because electronic devices are assumed to be unable to properly identify the distorted image without human assistance, a correctly entry is presumed to have been generated by a human. Only after the correct letters/digits are entered, does the electronic device make the Web resource accessible to the user.

In another approach, pairing is controlled between a human and an electronic terminal (e.g., mobile phone) using a passcode/draw-pattern. A terminal can allow users to lock the terminal to prevent unauthorized use. To unlock the terminal, a user either enters a predefined pass-code or draws a predefined pattern on a touch-screen or touchpad of the terminal (e.g., connecting a group of dots through finger movements).

In another approach, pairing is controlled between two electronic terminals responsive to bumping the devices together. With the "bump" application running on the terminals, users can bump together the terminals to cause pairing with establishment of a communication channel for sharing content or conducting transactions.

Various operational challenges may arise when attempting to use one or more of these approaches for entity pairing. Regarding barcode scanning, usability of the process depends upon taking an accurate picture of the entire barcode, which can require the user to position the terminal facing and a particular distance from the barcode. Lightning can have an impact as well, because insufficient lighting on the barcode and/or reflections on the terminal display can make it difficult or not possible to accurately scan the barcode. Pairing is prevented until a properly scanned image of the barcode is obtained and a complete match is identified.

Regarding CAPTCHA, Web sites are making the challenges harder to be electronically recognized, which results in ever increasing levels of reading difficulty for humans. When a user enters incorrect letters/digits, a new challenge is displayed, and the process of interpretation has to be repeat until all correct letters/digits are entered.

These and other operational challenges can delay the pairing process, reduce accuracy of the pairing process, and frustrate users. Consequently, these approaches to entity pairing may result in unacceptable user experiences. Users may abort pairing because of the frustration and/or delay caused by hard-to-read challenges, hard-to-scan barcodes, and repetition of failed process steps.

SUMMARY

Various embodiments of the present invention are directed to providing improved pairing processes that are controlled by motion challenges generated by an electronic resource and corresponding physical motion responses by a pairing entity. The use of motion challenges and corresponding responses may overcome one or more of the operational challenges discussed above with regard to use of barcode scanning, CAPTCHA, or other pairing approaches.

One embodiment is directed to a method performed by an electronic resource to control its pairing to a pairing entity. A motion challenge is generated that identifies a physical motion that is to be followed by the pairing entity to obtain pairing to the electronic resource. A motion response by the pairing entity is compared to the motion challenge. Pairing between the pairing entity and the electronic resource is controlled in response to the comparison.

In some further embodiments, the motion challenge is displayed as a motion pattern on a display device of the electronic resource. The motion pattern shows motions that are to be followed by corresponding physical motion of the pairing entity, such as by moving and/or rotating the pairing entity in the manner shown by the displayed motion pattern. Motion information, which indicates movement of the pairing entity along at least two dimensional space, is received and compared to the motion pattern to generate at least one matching value that indicates a level of similarity.

The motion information may be received from the pairing entity through a wireless communication interface as a sequence of acceleration values generated by a motion sensor in the pairing entity. The motion information may alternatively be captured by a camera in the electronic resource that is observing motion of the pairing entity. The electronic resource may alternatively generate the motion information by tracking movement of a user's finger on a touch-sensitive display interface and/or tracking movement of a mouse device.

Pairing can be allowed to proceed between the pairing entity and the electronic resource when the level of similarity, between the generated motion challenge and the motion response by the pairing entity, satisfies a threshold value. Pairing is otherwise prevented from occurring when the level of similarity does not satisfy the threshold value. When the comparison identifies less than a threshold level of similarity, a simplified motion challenge may be generated which requires less complex physical motion to be followed by the pairing entity for pairing to occur.

Another embodiment is directed to pairing an electronic resource to a pairing entity. The electronic resource includes one or more microprocessors that are configured to generate a motion challenge that identifies a physical motion that is to be followed by the pairing entity to obtain pairing to the electronic resource. The one or more microprocessors compare a motion response by the pairing entity to the motion challenge, and control pairing between the pairing entity and the electronic resource in response to the comparison.

Still another embodiment is directed to an electronic pairing entity that is configured to be paired to an electronic resource. The electronic pairing entity includes a wireless communication transceiver, a motion sensor, and one or more microprocessors. The wireless communication transceiver is configured to communicate with the electronic resource. The motion sensor outputs a motion signal which is indicative of motion of the electronic pairing entity. The one or more microprocessors respond to at least initiation of a pairing mode in the electronic pairing entity by tracking motion indicated by the motion signal, communicating the tracked motion through the wireless communication transceiver to a matching microprocessor, and controlling pairing to the electronic resource based on a response signal from the matching microprocessor.

Other electronic resources, electronic pairing entities, and/or methods according to embodiments of the invention will be or become apparent to one with skill in the art upon review of the following drawings and detailed description. It is intended that all such additional electronic resources, electronic pairing entities, and/or methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Figure 1:
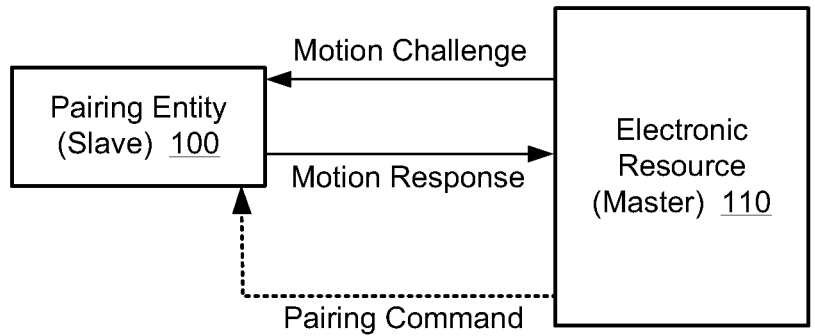
FIG. 1 is a block diagram of a system that is configured to operate according to some embodiments to control pairing responsive to motion challenges and corresponding responses.

FIG. 1 is a block diagram of an example system that controls pairing between a pairing entity 100 and an electronic resource 110. The pairing process can establish a dedicated communication channel between the pairing entity 100 and the electronic resource 110 to allow communication of information traffic there between. Alternatively, restricted communications may be allowed (e.g., restricted to sending resending certain types of information, such as pairing setup related control information) between the pairing entity 100 and the electronic resource 110 through a restricted communication channel or a separate communication channel until pairing is carried-out, and, after pairing is carried-out, unrestricted communication traffic may be allowed through dedicated a communication channel there between.

Examples of the pairing entity 100 include, but are not limited to, a human being and an electronic communication terminal. Examples of the electronic resource 110 include, but are not limited to, a Web resource such as a Web page server, a communication terminal, a stationary electronic interface, a sales terminal, and product information kiosk.

According to some embodiments, pairing between the electronic resource 110 and the pairing entity 100 is controlled in response whether the pairing entity 100 responds properly to a motion challenge that is generated by electronic resource 110. Because the electronic resource 110 generates the motion challenge and the pairing entity must respond with corresponding motions, the electronic resource 110 can be referred to as the "master" and the pairing entity 100 can be referred to as the "slave." FIGS. 2 and 3 illustrate flowcharts of operations and methods 200, 300 that may be performed by the electronic resource 110.

Figure 2:
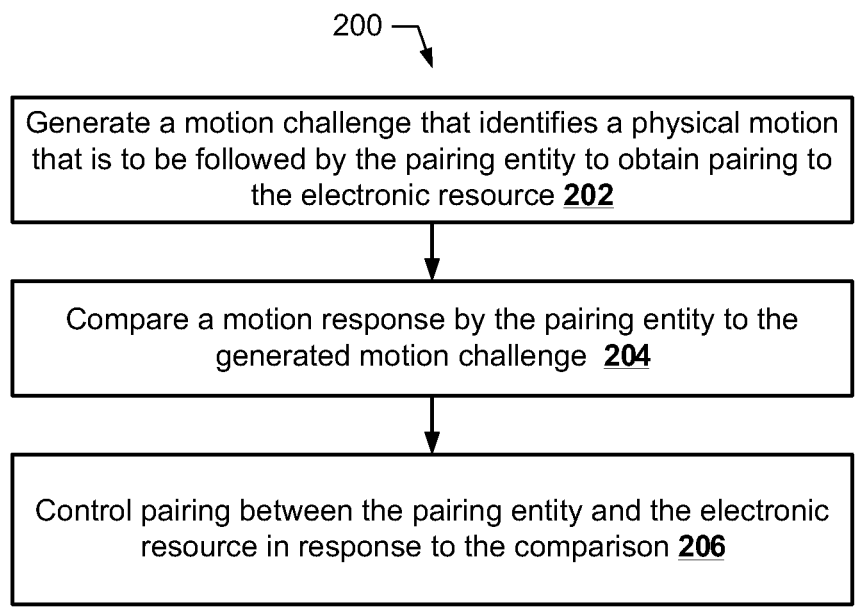
FIGS. 2 and 3 illustrates flowcharts of operations and methods that may be performed by the electronic resource of FIG. 1 in accordance with some further embodiments.

Referring to FIGS. 1 and 2, the electronic resource 110 generates (block 202) a motion challenge that identifies a physical motion that is to be followed by the pairing entity 100 to obtain pairing to the electronic resource 110. The motion challenge may be displayed as a moving cursor or other pattern on a display device of the electronic resource 110. The pairing entity 100 is moved (e.g., translational movement and/or rotation) to provide a motion response that is received by and/or sensed by the electronic resource 110. The electronic resource 110 compares (block 204) the motion response by the pairing entity 100 to the motion challenge, and controls (block 206) pairing between the pairing entity 100 and the electronic resource 110 in response to the comparison.

Figure 3:
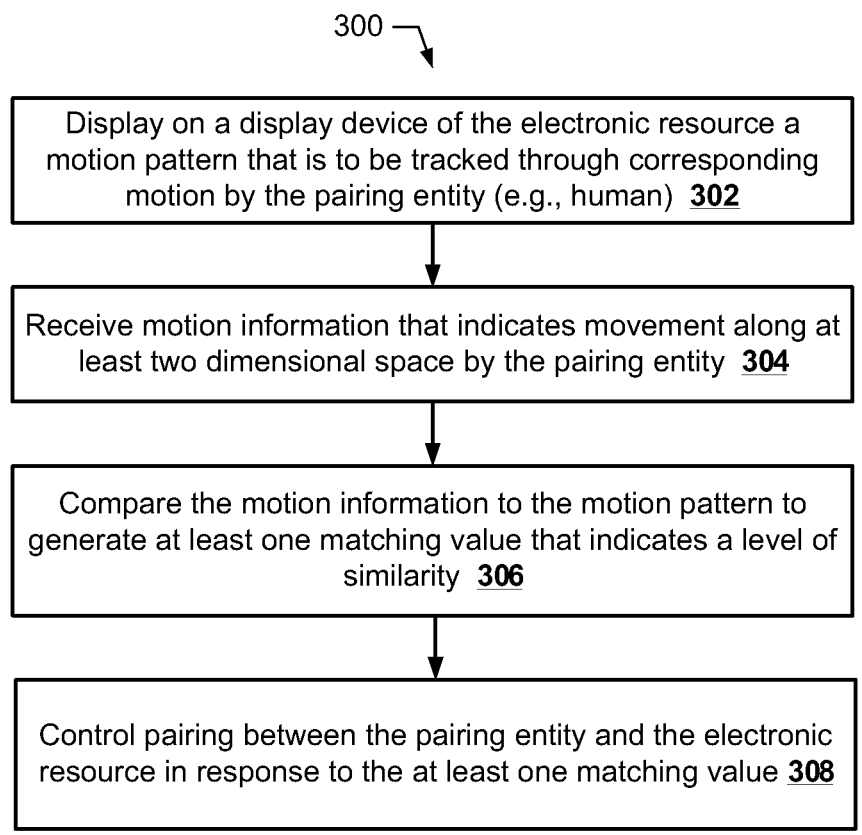

Referring to FIGS. 1 and 3, the electronic resource 110 may generate the motion challenge by displaying (block 302), on a display device of the electronic resource 110, a motion pattern that is to be tracked through corresponding motion by the pairing entity 100. The electronic resource 110 may compare the motion response by the pairing entity 100 to the motion challenge by receiving (block 304) motion information that indicates movement along at least two dimensional space by the pairing entity 100, and comparing (306) the motion information to the motion pattern to generate at least one matching value that indicates a level of similarity. The electronic resource 110 may then control (block 308) pairing of itself to the pairing entity 100 in response to the at least one matching value. For example, when the comparison determines that a sufficient level of matching has occurred, the electronic resource 110 may communicate a pairing command to the pairing entity 100 that facilitates setup of a dedicated communication channel there between.

By way of further example, the electronic resource 110 may generate the motion challenge by displaying a moving cursor on a display device, and allowing pairing to occur when the pairing entity 100 responds with movement that sufficiently matches the motion displayed by the moving cursor. Thus, a user may be challenged to follow sinusoidal, spiral, and/or other curved line and/or straight line patterns, being dynamically drawn on the display device, by moving the pairing entity 100, moving a finger/hand/or other object relative to a camera of the electronic resource 110, tracing a surface of a touch-sensitive display of the electronic resource 110, and/or moving a mouse device of the electronic resource 110 to achieve pairing to the electronic resource 110. Accordingly, the pairing processes can be used to pair an electronic pairing entity to an electronic resource, to pair a human being as the pairing entity to an electronic resource, or to pair two or more electronic pairing entities (e.g., the electronic resource is incorporated into one or more of the electronic pairing entities).

Pairing Electronic Pairing Entity to an Electronic Resource

Figure 4:
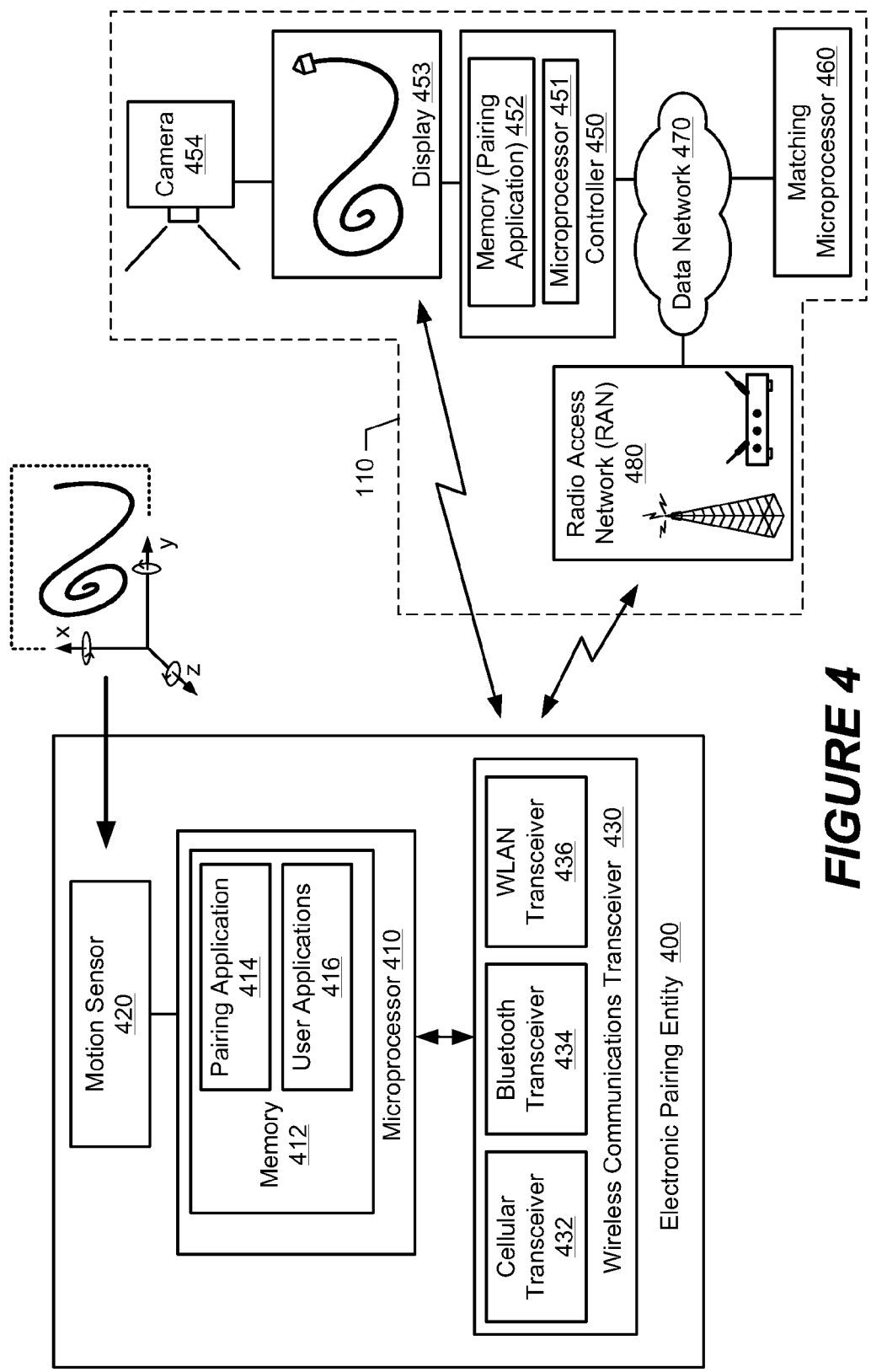
FIG. 4 is a further block diagram of the system of FIG. 1 configured to operate in accordance with some further embodiments to control pairing between an electronic pairing entity and an electronic resource.

FIG. 4 is a further block diagram of the system of FIG. 1 that is configured to operate in accordance with some embodiments to control pairing between an electronically operated pairing entity 400 (i.e. a communication device operated by a human) and the electronic resource 110. Examples of the electronic pairing entity 400 can include, but are not limited to, a wireless communication terminal (e.g., smart phone), a desktop computer, a laptop computer, a table computer, a gaming console, an electronic reader (e.g., e-book).

The electronic resource 110 includes a controller 450 that generates a motion challenge. The controller 450 can include a microprocessor 451, which can contain or otherwise access a memory 452 having a pairing application. The microprocessor 451 may include one or more data processing circuits, such as a general purpose and/or special purpose microprocessor. The microprocessor 451 executes computer program instructions from the pairing application in the memory 452, described below as a computer readable medium, to generate the motion challenge and control pairing according to some or all of the operations and methods that are described herein for one or more of the embodiments.

As will be explained further below, motion by the electronic pairing entity 400 may be sensed by a motion sensor 420 of the electronic pairing entity 400 and/or sensed by a camera 454 of the electronic resource 110, and the sensed motion is compared to the motion challenge by a matching microprocessor 460. The controller 450 responds to the comparison by controlling pairing between one or more elements of a radio access network (RAN) 480 and the electronic pairing entity 400 to establish and/or regulate use of a communication channel there between. The controller 450, the matching microprocessor 460, and the RAN 480 may be connected through one or more data networks 470 (e.g., private/public networks) and/or may be connected through one or more direct communication links.

The controller 450 may generate the motion challenge by displaying on a display device 453 a motion pattern that is to be tracked through corresponding movement by the electronic pairing entity 400. A user observing the motion pattern being drawn on the display 453 can move the pairing entity 400 in a corresponding manner along a line defined by a single axis, along a plane defined by two orthogonal axes, and/or along a space defined by three orthogonal axis (e.g., the illustrated x, y, z axes), and/or can move the pairing entity 400 in a corresponding manner by rotating the pairing entity 400 about one or more of the defined axis.

Use Motion Sensor to Track Motion

In some embodiments, the electronic pairing entity 400 includes the motion sensor 420, one or more microprocessors 410, and a wireless communications transceiver 430. The motion sensor 420 outputs a motion signal that is indicative of translational movement of the electronic pairing entity 400 along one or more defined axes (e.g., the illustrated x, y, z axes) and/or rotational movement about one or more of the defined axes.

The microprocessor 410 can include or otherwise access a memory 412 that contains a pairing application 414 and may contain other user applications 416 (e.g., games, user information databases, etc). The microprocessor 410 may include one or more data processing circuits, such as a general purpose and/or special purpose microprocessor. The microprocessor 410 executes computer program instructions from the applications 414,416 in the memory 412, described below as a computer readable medium, to perform some or all of the operations and methods that are described herein for one or more of the embodiments.

The microprocessor 410 executes the pairing application 414 to control pairing with the RAN 480. The microprocessor 410 may respond to initiation of a pairing mode by tracking (e.g., sampling and storing) the motion signal to generate motion information. The motion information may be a sequence of acceleration values along or rotationally about one or more of the defined axes. The microprocessor 410 may communicate the motion information through the wireless communication transceiver 430 to the matching microprocessor 460.

Figure 5:
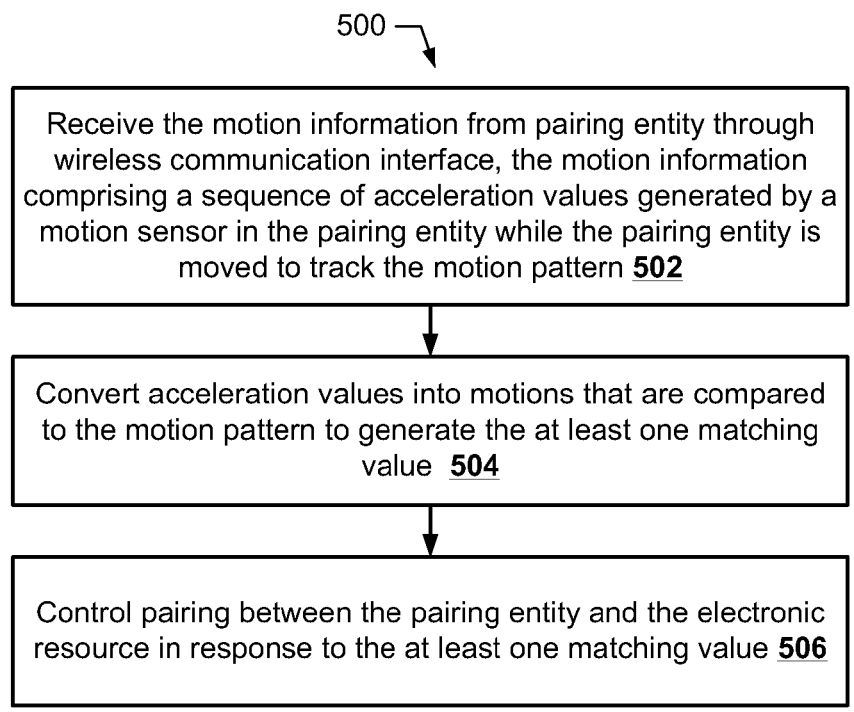
FIGS. 5 and 6 illustrate flowcharts of operations and methods that may be performed by the electronic resource of FIG. 1 to control pairing with the electronic pairing entity.

FIG. 5 illustrates operations and methods 500 that may be performed by the matching engine 460 and the controller 450 responsive to the motion information from the electronic pairing entity 400. Referring to FIGS. 4 and 5, the matching engine 460 receives (block 502) the motion information through the RAN 480, and converts (block 504) the acceleration values into motions that are compared to the motion pattern (received from the controller 450) to generate at least one matching value that indicates a level of similarity. The matching engine 460 communicates the at least one matching value to the controller 450. The controller 450 controls pairing (block 506) between the pairing entity 400 and the RAN 480 responsive to the at least one matching value.

Use Camera to Track Motion

Figure 6:
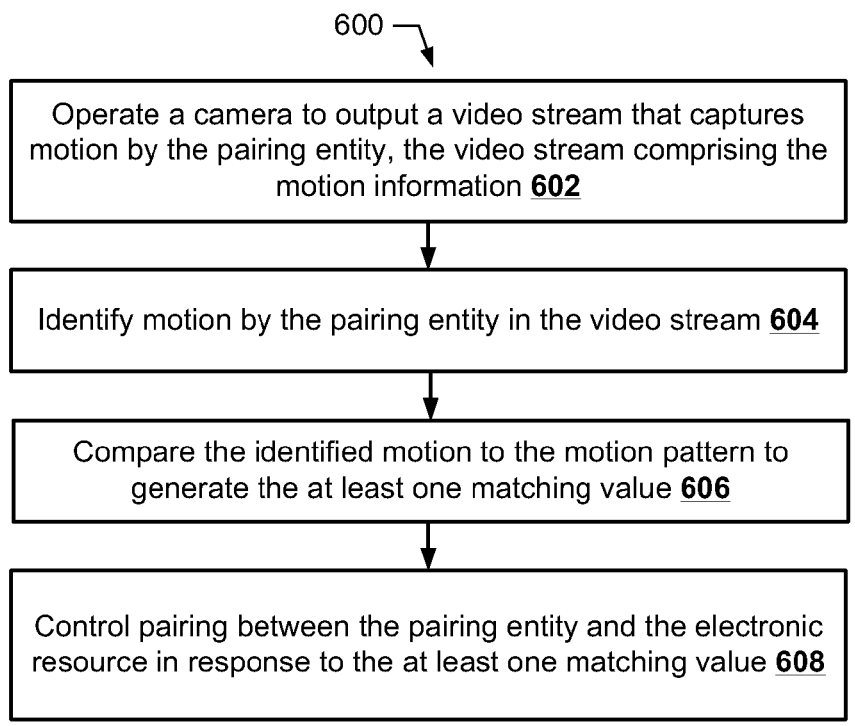

In some embodiments, the electronic resource 110 includes a camera 454 that is used to sense movement of the pairing entity 400 for comparison to the motion pattern generated as a challenge by the controller 450. FIG. 6 illustrates operations and methods 600 that may be performed by the camera 454, the matching engine 460, and the controller 450 to control pairing responsive to motion of the pairing entity 400.

Referring to FIGS. 4 and 6, the camera 454 is operated (block 602) to output a video stream that captures motion by the pairing entity 400 (when the pairing entity 400 is positioned within the field-of-view of the camera 454), where the video stream includes the motion information. The matching microprocessor 460 is configured to identify (block 604) motion by the pairing entity 400 in the video stream 604 (e.g., by comparison of the location and/or orientation of the pairing entity 400 across a sequence of video frames). The matching microprocessor 460 compares the identified motion to the motion pattern generated as the challenge to generate the at least one matching value (block 606) that indicates a level of similarity. The matching engine 460 communicates the at least one matching value to the controller 450. The controller 450 controls (block 608) pairing between the pairing entity 400 and the RAN 480 responsive to the at least one matching value.

Comparison of Motion Challenge and Motion Response

Responsive to initiating of the pairing process, the matching microprocessor 460 starts a matching process that compares motion information updates that are received from the pairing entity 400 and/or sensed by the camera 454 as the pairing entity 400 is being moved by a user to track the dynamically changing motion pattern that is being displayed on the display 453. To avoid infinite matching, the matching microprocessor 460 can initiate a timeout timer that will cause termination of the pairing process (preventing pairing from occurring), when a sufficient level of matching does not occur before expiration of the timer.

When the matching microprocessor 460 has received a sufficiently long track of the motion information to allow comparison, it performs the comparison (e.g., blocks 504 and 606) and outputs a probability value (p) (or matching value) which represents a level of similarity between the compared motions.

Two threshold probability values may be predefined for evaluating how closely the pairing entity 400 is being moved to follow the motion challenge: $th_1$ and $th_2$ ($0 \leq th_1 \leq th_2 \leq 1$). A probability value (p) that is below a first threshold value, $th_1$, indicates that the pairing entity 400 is not following the motion pattern with sufficient similarity and the matching microprocessor 460 may communicate a command to the controller 450 and/or to the pairing entity 400 to terminate the pairing process and prevent pairing from occurring. When the probability value (p) is above a second threshold value, $th_2$, indicating that the pairing entity 400 is following the motion pattern with a high level of similarity, the matching microprocessor 460 may allow pairing to proceed by communicating a command to the controller 450 and/or to the pairing entity 400 to trigger another step of the pairing process. In contrast, when the probability value (p) falls within a "gray zone" between the first and second threshold values, $th_1$ and $th_2$, the matching microprocessor 460 may determine that the user is making a legitimate attempt to move the pairing entity 400 to match the motion pattern, but also determine that further attempts by the user will be allowed by continuing generation of the motion pattern and comparison of the challenge and response motions (e.g., repeating the operations of FIGS. 5 and/or 6).

Figure 10:
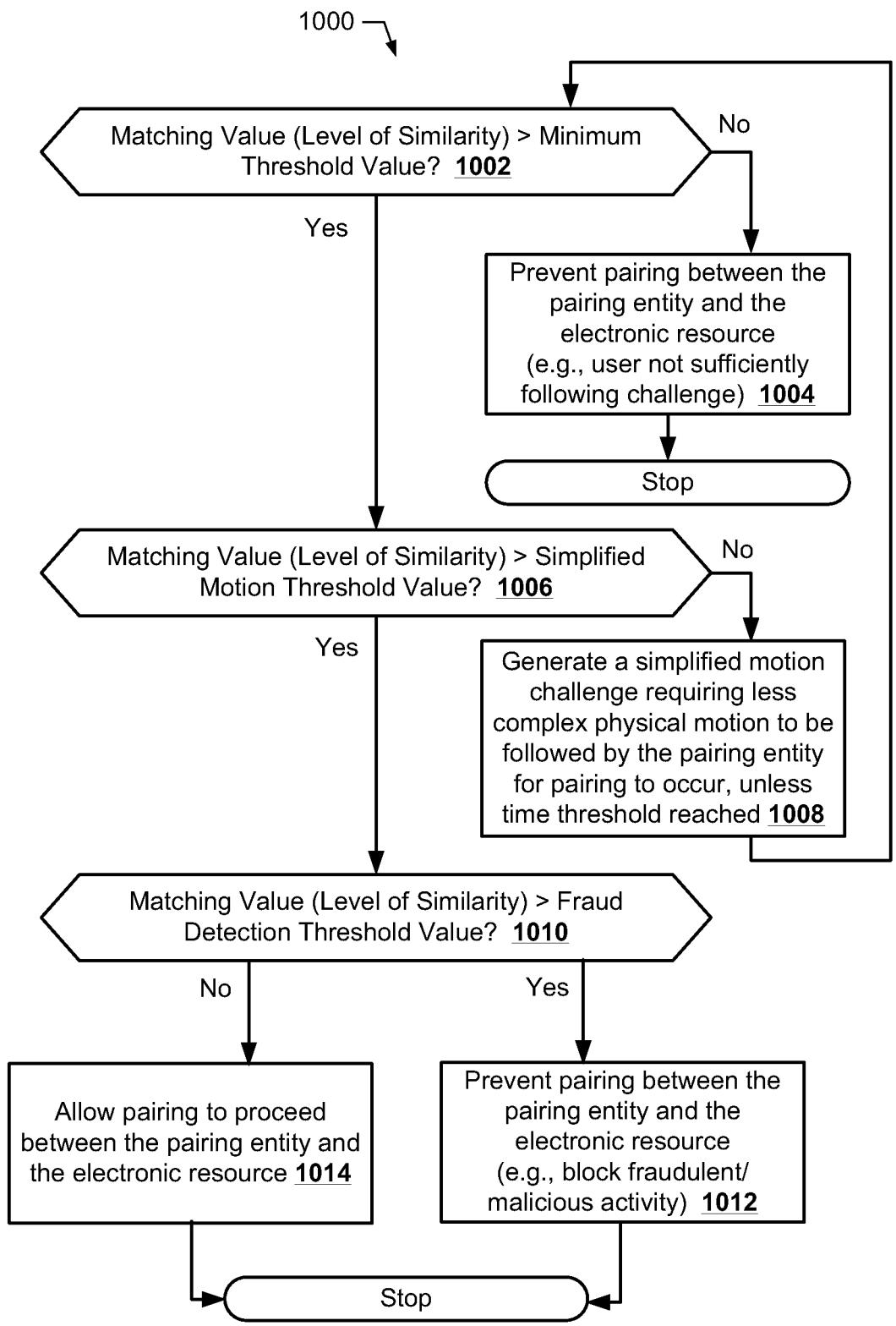
FIG. 10 illustrates a flowchart of operations and methods by the systems of FIGS. 1, 4, 7, and/or 8 that allows pairing to proceed when the motion matching is between defined threshold values, where one threshold value corresponds to a level of mismatch that distinguishes desirable human responsive motion from undesirable automated responsive motion by an electronic device, and another threshold value causes generation of a simplified motion challenge when a user is having difficulty sufficiently tracking a physical movement required by a motion challenge.

Further example operations are now explained with regard to FIG. 10. FIG. 10 illustrates a flowchart of operations and methods 1000 by the systems of FIGS. 1, 4, 7, and/or 8 that allows pairing to proceed when the motion matching is between defined threshold values, where one threshold value corresponds to a level of mismatch that distinguishes desirable human responsive motion from undesirable automated responsive motion by an electronic device, and another threshold value causes generation of a simplified motion challenge when a user is having difficulty sufficiently tracking a physical movement required by a motion challenge.

Referring to FIG. 10, the controller 450 determines (block 1002) whether the probability value (p) (matching value) is greater than a minimum threshold level. When less, the controller 450 prevents pairing from occurring (block 1004) because the user is not sufficiently tracking the motion pattern. In contrast, when the probability value (p) (matching value) is greater than the minimum threshold level, the controller 450 further determines (block 1006) whether the probability value (p) (matching value) is greater than a simplified motion threshold value.

When less, the controller 450 generates (block 1008) a simplified motion challenge that requires less complex physical motion to be followed by a user who is moving the pairing entity 400 to cause pairing to be allowed by the controller 450. Accordingly, the motion challenge may be simplified, with the goal of enabling a user who is making a good faith attempt to properly move the pairing entity 400 to have a further but simpler opportunity to attempt to more accurately track the motion challenge and obtain pairing between the pairing entity 400 and the RAN 480.

The adjustment to the motion challenge can be based on observation of what types of motions have been more accurately or less accurately followed by the user. The controller 450 may, for example, determine that the pairing entity 400 has not accurately tracked up/down movements and, responsive to the determination, may restrict further motion pattern to primarily, or exclusively, left/right movements and/or rotational movements. Similarly, the controller 450 may, for example, determine that the pairing entity 400 has not accurately tracked up/down and/or right/left movements and, responsive to the determination, may restrict further motion pattern to primarily, or exclusively, rotational movements.

When the probability value (p) (matching value) is greater than the simplified motion threshold value, the controller 450 further determines (block 1010) whether the probability value (p) (matching value) is greater than a fraud detection threshold value. When the probability value (p) (matching value) is greater than the simplified motion threshold value, the controller 450 prevents pairing from occurring (block 1012). The fraud detection threshold value may be defined to correspond to a level of mismatch that distinguishes desirable human responsive motion from undesirable automated responsive motion by an electronic device. For example, a malicious program that is attempting to obtain pairing by automated motion responses may be identified and prevented from succeeding based on the motion responses achieving too much similarity to the motion challenges (e.g., probability value (p) (matching value) about equal to 1). A malicious program may generate an automated motion response by, for example, communicating motion information to the matching microprocessor 460 that was generated by electronic copying of the motion challenge, instead of by sensed movement from a human moving the pairing entity 400.

When the probability value (p) (matching value) is less than the fraud detection threshold value, the controller 450 allows pairing to proceed (block 1014) between the pairing entity 400 and the RAN 480. The controller 450 may allow pairing to proceed by communicating further pairing commands to the pairing entity 400 that trigger completion of further operations in the pairing process.

Figure 7:
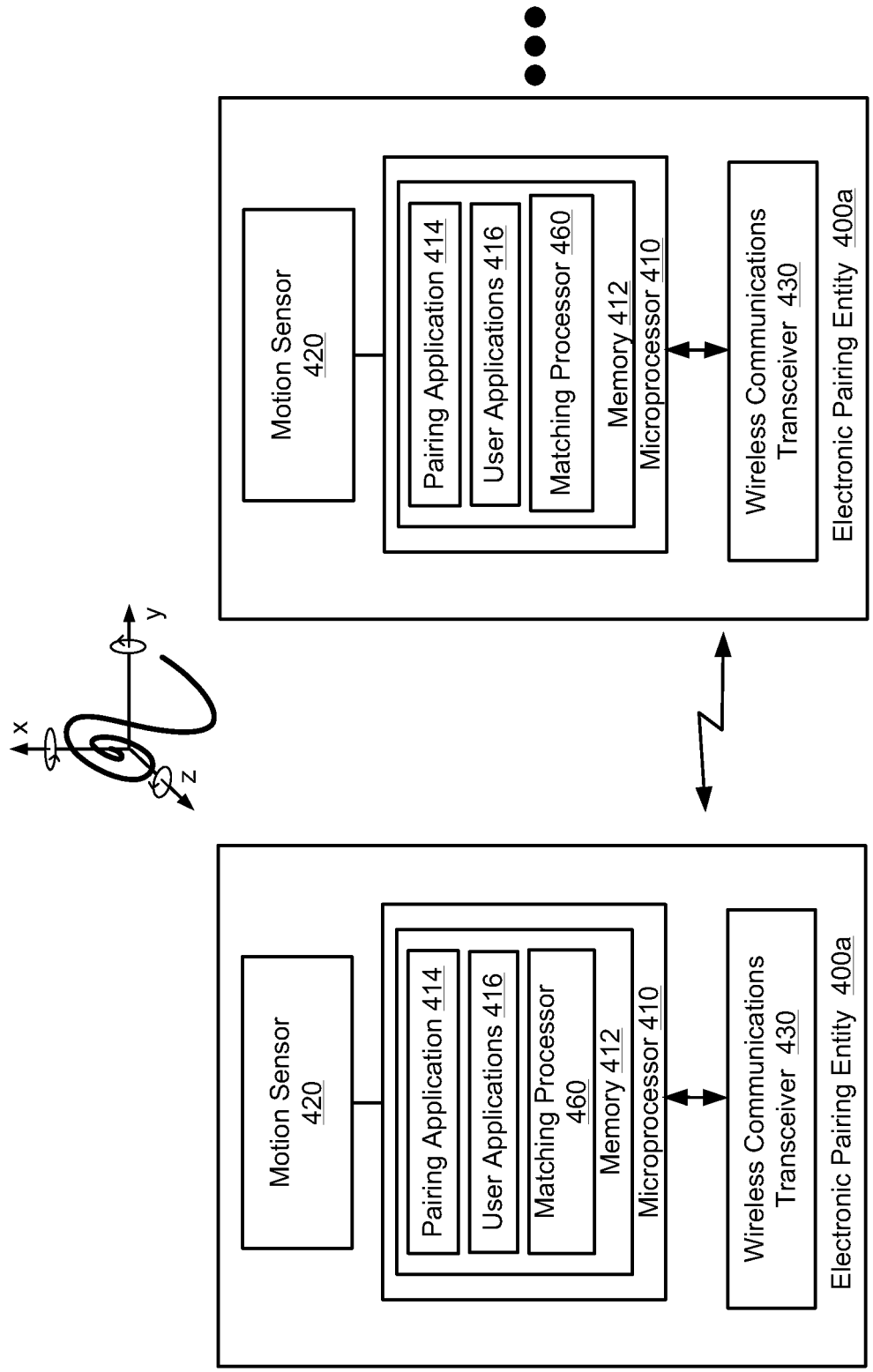
FIG. 7 is a block diagram of two electronic pairing entities that are configured to control pairing there between responsive to detection of similar physical motions.
Figure 11:
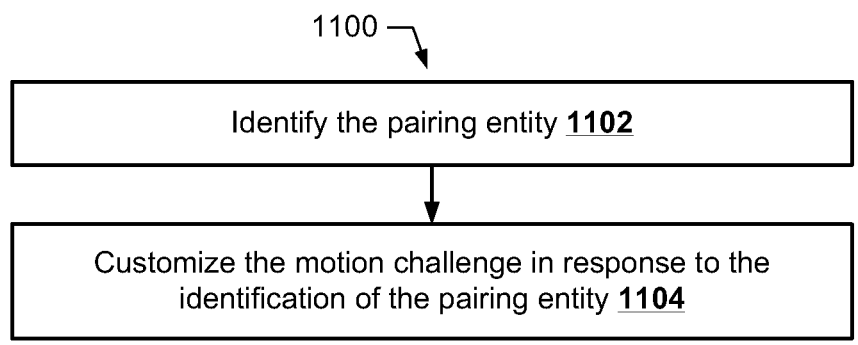
FIG. 11 illustrates a flowchart of operations and methods by the systems of FIGS. 1, 4, 7, and/or 8 that customize the motion challenge based on an identity of the pairing entity.

FIG. 11 illustrates a flowchart of operations and methods 1100 that may be performed by the systems of FIGS. 1, 4, 7, and/or 8 to customize the motion challenge based on an identity of the pairing entity. The operations and methods 1100 may be, for example, performed by block 1008 of FIG. 10. The controller 450 may identify (block 1102) the pairing entity 400, and may customize (block 1104) the motion challenge in response to the identification. For example, the controller 450 may maintain a historical record of the how accurately a particular identified pairing entity was able to track certain motion challenges, and may exclude for a present motion challenge certain movements (e.g., rotational movements) that were not accurately followed during one or more previous pairing processes. The historical record may additionally or alternatively identify one or more motion patterns that a user has previously defined to be used by the controller 450 when performing the pairing process for a particular identified pairing entity.

Thus, depending on the application, the controller 450 can learn the pairing entity's 400 ability to following motion challenges and/or learn preferred motions of a user operating the pairing entity 400, and can store this knowledge for subsequent use when generate a motion challenge. When the same pairing entity 400 attempts to pair, the controller 450 can adjust the generated motion challenge based on this knowledge, so that the pairing process would become easier and/or more acceptable to the user.

Controlling One or more Communication Channels

As explained above, the pairing process can establish a dedicated communication channel between the wireless communications transceiver 430 of the pairing entity 100 and the RAN 480 of the electronic resource 110 to allow communication of information traffic there between. Alternatively, restricted communications may be allowed (e.g., restricted to sending resending certain types of information, such as pairing setup related control information) between the pairing entity 100 and the electronic resource 110 through a restricted communication channel or a separate communication channel until pairing is carried-out, and, after pairing is carried-out, unrestricted communication traffic may be allowed through dedicated a communication channel there between.

The wireless communications transceiver 430 of the pairing entity 400 man include a plurality of different transceivers, such as the illustrated cellular transceiver 432, Bluetooth transceiver 434, and WLAN transceiver 436. The cellular transceiver 432 may communicate with the RAN 480 using one or more protocols that may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, Universal Mobile Telecommunications System (UMTS), and/or 3GPP LTE (3rd Generation Partnership Project Long Term Evolution). The Bluetooth transceiver 434 may communicate with the RAN 480 using the Bluetooth protocol, and the WLAN transceiver 436 may communicate with the RAN 480 using WiFi and/or WiMax.

In some embodiments, the microprocessor 410 of the pairing entity 400 may respond to initiating of the pairing process by communicating the tracked motion information from the motion sensor 420 through a first one of the transceivers 432,434,436 to the RAN 480 for delivery to the matching microprocessor 460, and to control pairing through a second one of the transceivers 432,434,436 based on a response command received from the matching microprocessor 460 or the controller 450 through the first one of the transceivers 432,434,436. Thus, for example, the pairing entity 400 may communicate the motion information from the sensor 420 to the matching microprocessor 460 using a cellular channel, and then complete pairing to setup a Bluetooth channel and/or a WLAN channel responsive to the response command indicating that a motion response sufficiently matched the motion challenge.

Pairing Two or more Electronic Pairing Entities

Some embodiments may be used to control pairing between two or more electronic pairing entities (e.g., mobile communication terminals). FIG. 7 is a block diagram of two electronic pairing entities 400a and 400b that include component shown in FIG. 4, and which are configured to control pairing responsive to detection of similar physical motions. The matching microprocessor 460 of FIG. 4 is not incorporated in one or both of the pairing entities 400a and 400b.

For example, one person can wave/move the entity 400a in the air, while another person can make synchronized movement of the entity 400b to cause the entities 400a and 400b to be paired with a communication channel established there between. The pairing entities 400a and 400b may exchange their sensed motion information for comparison by the matching microprocessor 460, and paring can be allowed when the comparison identifies a sufficient level of matching. Similarly, a person can hold both entities 400a and 400b in the same hand or place them in a bag, and wave them according to a freely defined motion pattern or according to a predefined motion pattern to cause the entities 400a and 400b to be paired.

In this manner, two or more electronic pairing entities can be easily paired at the same time. In contrast, the earlier described bump process for pairing is limited to pairing only two entities at a time.

Pairing an Owner with an Electronic Resource

Some embodiments are also directed to controlling pairing between a user and an electronic resource (e.g., mobile communication terminal). Instead of using a pass-code or drawing a pattern to unlock an electronic resource, a user of the resource can pre-record a movement pattern on the resource by waving or otherwise moving the resource. Then, to unlock the resource, the user can move the resource in a way that matches the earlier recorded movement. In this embodiment, the matching microprocessor 460 resides in the electronic resource that is being locked/unlocked.

In contrast the earlier described pass-code or draw-pattern approaches for unlocking devices, the present embodiment may require less calibration does not require the user to view a screen of the resource, and may be more easily remembered by the user and/or more enjoyably carried out by the user.

Pairing a Human with an Electronic Resource

Some embodiments are directed to controlling pairing between a human user and an electronic resource. For example, pairing between a user and a Web resource may be controlled, and may function to prevent an automated software agent (non-human) from maliciously accessing Web resources or other electronic resources.

Figure 8:
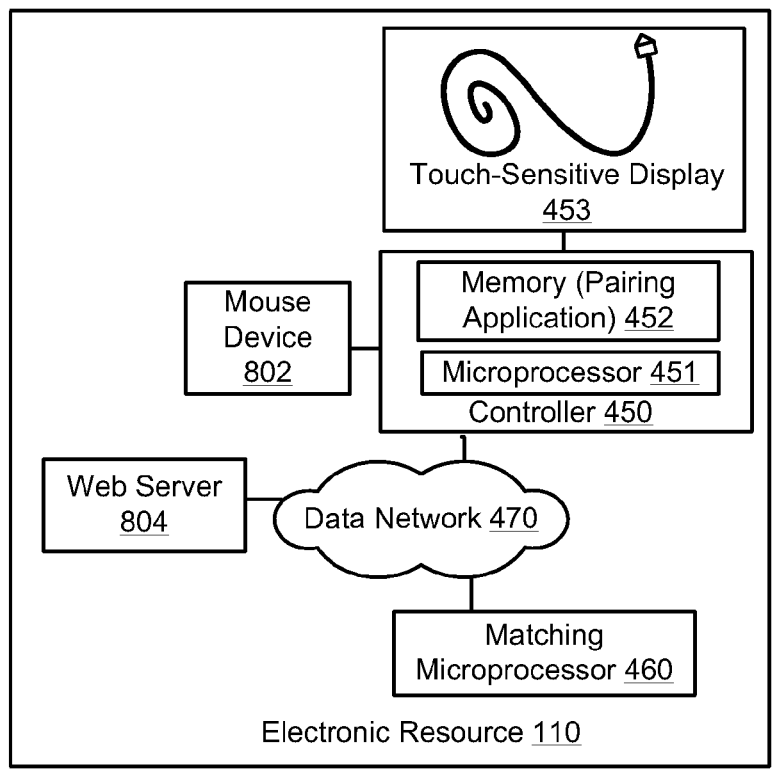
FIG. 8 is a block diagram of another system that controls pairing of a human to an electronic resource using a motion challenge generated by the electronic resource and a corresponding response by the human.
Figure 9:
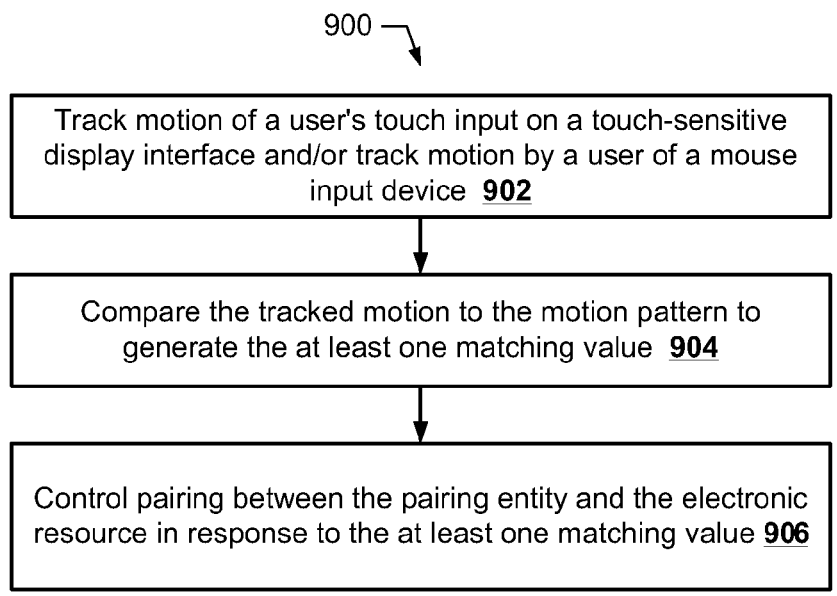
FIG. 9 illustrates a flowchart of operations and methods that may be performed by the system of FIG. 8 to control pairing responsive to tracking motion of a user's touch input on a touch-sensitive display interface and/or tracking motion of a mouse device.

FIG. 8 is a block diagram of another system that controls pairing of the user to the electronic resource 110 using a motion challenge generated by the electronic resource 110 and a corresponding response by the human. The resource 110 can configured in a similar manner to as shown in FIG. 4, but may further include a touch-sensitive display 453 and/or a mouse device 802. FIG. 9 is a flowchart of operations and methods 900 that may be performed by the controller 450 and matching microprocessor 460 of FIG. 8 to control pairing between a human and an application on a Web server 804 or another component of the electronic resource 110.

The controller 450 may be configured to generate a motion challenge (motion pattern) that is displayed on the display 800, such as was described above with regard to FIG. 4. The matching microprocessor 460 can track (block 902) the user's motion response to the motion challenge, by tracking motion of the user's touch input on the touch-sensitive display 800 and/or tracking motion by the user of the mouse device 802. The matching microprocessor 460 can compare (block 904) the tracked motion response to the motion challenge (motion pattern) to generate the at least one matching value, as describe above regarding FIG. 4. The controller 450 can control pairing (block 906) between the human and the application on a Web server 804 or another component electronic resource 110 in response to the at least one matching value.

In some embodiments, the controller 450 can be configured to identify and prevent an attempt by a malicious program to obtain pairing to a component of the electronic resource 110 by comparing the at least one matching value to a threshold value that indicates whether a sufficient level of miss-matching has occurred so that a human is believed to have generated the motion response instead of an automated motion response by an electronic device. Thus, the controller 450 may allow pairing to proceed in response to the at least one matching value satisfying a first threshold value that indicates that a sufficient level of matching has occurred and in response to the at least one matching value satisfying a second threshold value that indicates that a sufficient level of miss-matching has occurred so that a human generated motion response has occurred instead of an automated motion response by an electronic device.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a microprocessor circuit of a general purpose computer circuit, special purpose computer circuit, and/or other programmable data processing circuit to produce a machine, such that the instructions, which execute via the microprocessor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a microprocessor such as a digital signal microprocessor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method performed by an electronic resource to control pairing to a pairing entity for communications there between, the method comprising the steps of:

generating a motion challenge that identifies a physical motion that is to be followed by the pairing entity to obtain pairing to the electronic resource, wherein the step of generating the motion challenge further comprises displaying, on a display device of the electronic resource, a motion pattern that is to be tracked through corresponding motion by the pairing entity;

comparing a motion response by the pairing entity to the motion challenge, wherein the step of comparing the motion response by the pairing entity to the motion challenge further comprises receiving motion information that indicates movement along at least two dimensional space by the pairing entity, and comparing the motion information to the motion pattern to generate at least one matching value that indicates a level of similarity, further wherein the step of receiving motion information further comprises tracking motion of a user's touch input on a touch-sensitive display and/or tracking motion by a user of a mouse device; and the step of comparing the motion information to the motion pattern comprises comparing the tracked motion to the motion pattern to generate the at least one matching value; and controlling pairing between the pairing entity and the electronic resource in response to the comparison, wherein the step of controlling pairing further comprises allowing pairing to proceed between the pairing entity and the electronic resource in response to the at least one matching value satisfying a first threshold value that indicates that a sufficient level of matching has occurred and in response to the at least one matching value satisfying a second threshold value that indicates that a sufficient level of miss-matching has occurred so that a human generated motion response has occurred instead of an automated motion response by an electronic device.

2. An electronic resource for pairing to a pairing entity, the electronic resource comprising:

one or more microprocessors that are configured to generate a motion challenge that identifies a physical motion that is to be followed by the pairing entity to obtain pairing to the electronic resource; compare a motion response by the pairing entity to the motion challenge; and control pairing between the pairing entity and the electronic resource in response to the comparison;

a display device, wherein the one or more microprocessors are further configured to generate the motion challenge by displaying on the display device a motion pattern that is to be tracked through corresponding motion by the pairing entity; and compare the motion response by the pairing entity to the generated motion challenge by receiving motion information that indicates movement along at least two dimensional space by the pairing entity, and compare the motion information to the motion pattern to generate at least one matching value that indicates a level of similarity;

a touch-sensitive display and/or a mouse device, wherein the one or more microprocessors are further configured to track motion of a user's touch input on the touch-sensitive display interface and/or to track motion of a user's movement of the mouse device, and to compare the tracked motion to the motion pattern to generate the at least one matching value, wherein the one or more microprocessors are further configured to allow pairing to proceed between the pairing entity and the electronic resource in response to the at least one matching value satisfying a first threshold value that indicates that a sufficient level of matching has occurred and in response to the at least one matching value satisfying a second threshold value that indicates that a sufficient level of miss-matching has occurred so that a human has generated motion response has occurred instead of an automated motion response by an electronic device.

* * * * *